United States Patent
Jin et al.

(10) Patent No.: US 8,027,644 B2
(45) Date of Patent: *Sep. 27, 2011

(54) TRANSCEIVER SYSTEM INCLUDING DUAL LOW-NOISE AMPLIFIERS

(75) Inventors: Xiaodong Jin, Sunnyvale, CA (US); Sehat Sutardja, Los Altos Hills, CA (US); Lawrence Tse, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/881,226

(22) Filed: Sep. 14, 2010

(65) Prior Publication Data

US 2011/0003562 A1    Jan. 6, 2011

Related U.S. Application Data

(63) Continuation of application No. 10/701,626, filed on Nov. 6, 2003, now Pat. No. 7,796,952.

(51) Int. Cl.
*H04B 1/38* (2006.01)
(52) U.S. Cl. .......................... 455/73; 455/78; 455/550.1
(58) Field of Classification Search .................. 455/73, 455/78, 83, 91, 101, 550.1
See application file for complete search history.

(56) References Cited

U.S. PATENT DOCUMENTS

| | | | |
|---|---|---|---|
| 5,752,180 A | 5/1998 | Guo et al. | |
| 6,125,109 A | 9/2000 | Fuerter | |
| 6,389,085 B1 | 5/2002 | Salt | |
| 6,728,517 B2 * | 4/2004 | Sugar et al. | 455/73 |
| 6,871,052 B2 | 3/2005 | Spencer et al. | |
| 7,110,381 B1 * | 9/2006 | O'Sullivan et al. | 370/338 |
| 7,212,788 B2 | 5/2007 | Weber et al. | |
| 7,457,617 B2 | 11/2008 | Adams et al. | |
| 7,796,952 B1 * | 9/2010 | Jin et al. | 455/73 |
| 2002/0118782 A1 | 8/2002 | Ohsawa | |
| 2002/0141513 A1 | 10/2002 | England | |
| 2003/0050032 A1 * | 3/2003 | Masaki | 455/272 |

FOREIGN PATENT DOCUMENTS

EP    1124337    2/2001

* cited by examiner

*Primary Examiner* — Raymond Dean (57) ABSTRACT

A transceiver system includes a first receive path with a first antenna configured to receive first signals, a first configuration switch, a first low noise amplifier configured to amplify the first signals, a second configuration switch, and a receiver. The first receive path is selectively configured to supply the amplified first signals to the receiver via the first antenna, the first configuration switch, the first low noise amplifier, and the second configuration switch. A second receive path includes a second antenna configured to receive second signals, a second low noise amplifier configured to amplify the second signals, the second configuration switch, and the receiver. The second receive path (i) includes fewer configuration switches than the first receive path and (ii) is selectively configured to supply the amplified second signals to the receiver via the second antenna, the second low noise amplifier, and the second configuration switch.

25 Claims, 7 Drawing Sheets

TRANSCEIVER SYSTEM INCLUDING DUAL LOW-NOISE AMPLIFIERS

CROSS REFERENCE TO RELATED APPLICATIONS

This application is a continuation of U.S. patent application Ser. No. 10/701,626 filed Nov. 6, 2003. The disclosure of the above application is incorporated herein by reference in its entirety.

FIELD OF THE INVENTION

The present invention relates to communication systems. More particularly, the present invention relates to a system and method for communicating information signals utilizing dual low-noise amplifiers.

BACKGROUND INFORMATION

In a conventional transceiver, such as, for example, a wireless transceiver, the received signal can be processed through a low-noise amplifier (LNA). The LNA amplifies very low-level received signals, while adding only minimal amounts of noise to the signal that can reduce receiver sensitivity. LNAs should be highly linear to handle weak signals in the presence of large interfering signals. Conventional transceivers use a single LNA. In transceiver systems that use multiple LNAs, the LNAs are not co-resident on a monolithic substrate, i.e., they reside on separate substrates.

Figure 1:
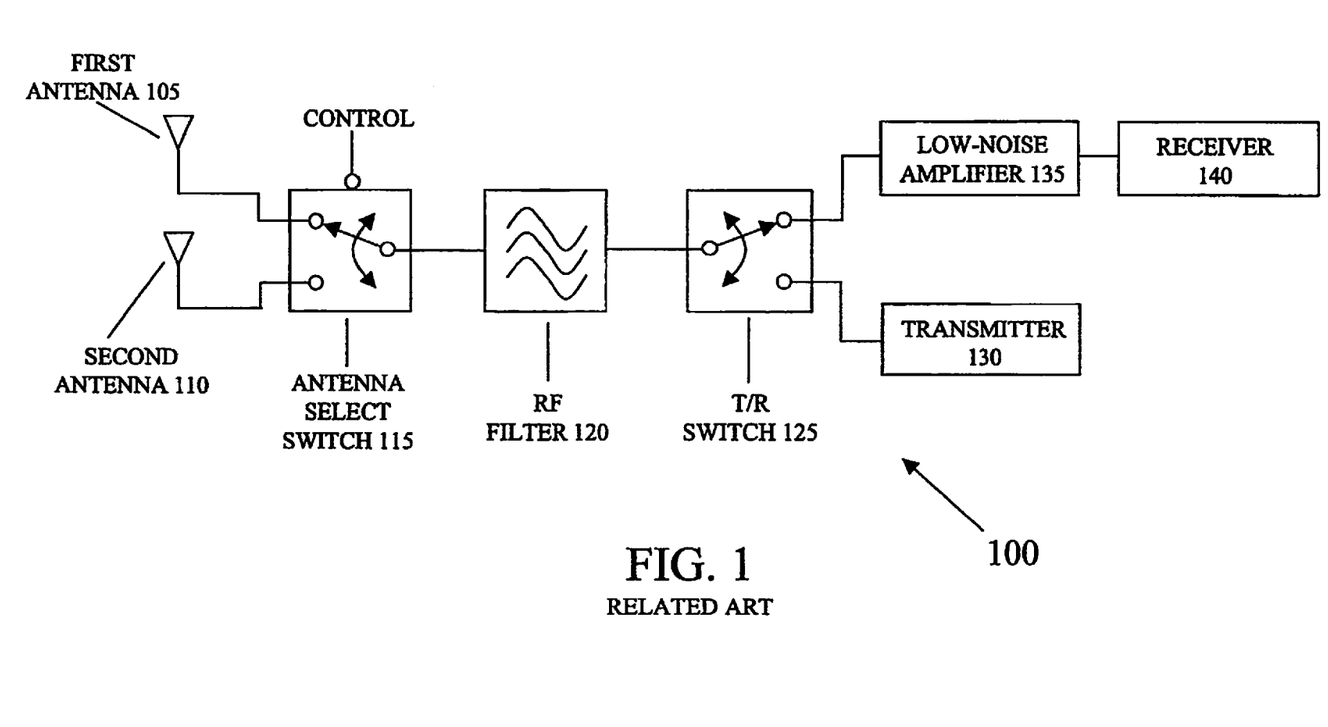
FIG. 1 is a simplified diagram illustrating several components of a conventional transceiver.

FIG. 1 is a simplified diagram illustrating several components of a conventional transceiver 100 using a single LNA. The transceiver 100 includes a first antenna 105 and a second antenna 110 for transmitting and receiving signals. An antenna selection switch 115 selects either first antenna 105 or second antenna 110 for transmitting and receiving information. A radio frequency (RF) bandpass filter 120 eliminates large interfering signals outside the frequency band of interest from reaching the receiver components of the transceiver 100, and can be used to reject image frequency interferers that can have drastic effects on the receiver. The RF bandpass filter 120 generally spans the desired system bandwidth for communicating information. A transmit/receive switch 125 connects either the transmitter components or the receiver components of the transceiver 100 to either the first antenna 105 or the second antenna 110. For example, a transmitter 130 is used to transmit information. For received signals, a LNA 135 amplifies the low-level received signals, while adding only minimal amounts of noise to the received signal, before passing the amplified signal to a receiver 140.

The transceiver 100 can include numerous other components, such as a duplexer, mixer, intermediate frequency (IF) bandpass filter, automatic gain control, local oscillator, phase locked loop, power supplies, and the like. Using these and previously-described components, a RF wireless transceiver can receive a RF signal, down-convert the RF signal to an IF signal and the IF signal to a baseband signal, and demodulate the baseband signal. Various filtering and signal processing can be performed on the received signal during and between each of the various phases of down-conversion and demodulation to maximize the received signal and improve reception and receiver sensitivity. An exemplary wireless receiver is described in, for example, U.S. Pat. No. 5,963,856.

The signal applied to the lone LNA 135 can, however, suffer from loss associated with the antenna selection switch 115, the RF bandpass filter 120 and the transmit/receive switch 125. This loss, which can be, for example, as much as approximately 3 dB, adversely affects receiver sensitivity. In addition, these components add additional cost to the transceiver 100. The use of other LNAs located on separate substrates, with their concomitant switches and filters, can result in additional loss, as well as increased cost due to the greater number of components.

SUMMARY OF THE INVENTION

A system and method are disclosed for communicating information signals. In accordance with exemplary embodiments, according to a first aspect of the present invention, a system for communicating information signals includes a receiver in selective communication with a first antenna and a second antenna. The receiver is configured to selectively receive information signals via the first antenna or the second antenna. The system includes a first low-noise amplifier in communication with the first antenna and in selective communication with the receiver. The first low-noise amplifier is configured to amplify a first information signal received by the first antenna to generate a first amplified signal. The system also includes a second low-noise amplifier in communication with the second antenna and in selective communication with the receiver. At least the first low-noise amplifier and the second low-noise amplifier are formed on a monolithic substrate. The second low-noise amplifier is configured to amplify a second information signal received by the second antenna to generate a second amplified signal. Either the first amplified signal or the second amplified signal is selectively applied to the receiver.

According to the first aspect, the system can include a switch in communication with the first low-noise amplifier, the second low-noise amplifier and the receiver. The switch can be configured to selectively apply the either the first or the second amplified signal to the receiver. The system can include a transmitter in communication with the first antenna. The transmitter can be configured to transmit information signals via the first antenna. According to exemplary embodiments, the receiver and the transmitter can be formed on the same monolithic substrate as the first and second low-noise amplifiers. The system can include a transmit/receive switch in communication with the first antenna, the first low-noise amplifier and the transmitter. The transmit/receive switch can be configured to selectively connect the first antenna to either the first low-noise amplifier or the transmitter.

According to the first aspect, the system can include a filter in communication with the first antenna and the transmit/receive switch. The filter can be configured to filter information signals communicated via the first antenna. According to an exemplary embodiment, the filter can comprise a radio frequency bandpass filter. The system can also include a filter in communication with the second antenna and the second low-noise amplifier. The filter can be configured to filter information signals communicated via the second antenna. According to an exemplary embodiment, the filter can comprise a radio frequency bandpass filter and the information signals communicated via the first and second antennas can comprise wireless radio frequency signals. The system can include a controller in communication with the first low-noise amplifier. The controller can be configured to provide a control signal to the first low-noise amplifier to control the first low-noise amplifier. The system can also include a controller in communication with the second low-noise amplifier. The controller can be configured to provide a control signal to the second low-noise amplifier to control the second low-noise amplifier. The system can be compliant with a standard selected from the group consisting of 802.11, 802.11a, 802.11b and 802.11g.

According to a second aspect of the present invention, a system for communicating information signals includes a receiver means for selectively receiving information signals via one of a first antenna means and a second antenna means. The receiver means is in selective communication with the first antenna means and the second antenna means. The system includes a first low-noise amplifier means for amplifying a first information signal received by the first antenna means to generate a first amplified signal. The first low-noise amplifier means is in communication with the first antenna means and in selective communication with the receiver means. The system includes a second low-noise amplifier means for amplifying a second information signal received by the second antenna means to generate a second amplified signal. At least the first low-noise amplifier means and the second low-noise amplifier means are formed on a monolithic substrate. The second low-noise amplifier means is in communication with the second antenna means and in selective communication with the receiver means. Either the first amplified signal or the second amplified signal is selectively applied to the receiver means.

According to the second aspect, the system can include a switch means for selectively applying the one of the first and second amplified signals to the receiver means. The switch means can be in communication with the first low-noise amplifier means, the second low-noise amplifier means and the receiver means. The system can include a transmitter means for transmitting information signals via the first antenna means. The transmitter means can be in communication with the first antenna means. According to exemplary embodiments, the receiver means and the transmitter means can be formed on the same monolithic substrate as the first and second low-noise amplifier means. The system can also include a transmit/receive switch means for selectively connecting the first antenna means to one of the first low-noise amplifier means and the transmitter means. The transmit/receive switch means can be in communication with the first antenna means, the first low-noise amplifier means and the transmitter means.

According to the second aspect, the system can include a filter means in communication with the first antenna means and the transmit/receive switch means. The filter means can be configured to filter information signals communicated via the first antenna means. According to an exemplary embodiment, the filter means can comprise a radio frequency bandpass filter means. The system can also include a filter means in communication with the second antenna means and the second low-noise amplifier means. The filter means can be configured to filter information signals communicated via the second antenna means. According to an exemplary embodiment, the filter can comprise a radio frequency bandpass filter means and the information signals communicated via the first and second antenna means can comprise wireless radio frequency signals. The system can include a controller means in communication with the first low-noise amplifier means. The controller means can be configured to provide a control signal to the first low-noise amplifier means to control the first low-noise amplifier means. The system can also include a controller means in communication with the second low-noise amplifier means. The controller means can be configured to provide a control signal to the second low-noise amplifier means to control the second low-noise amplifier means. The system can be compliant with a standard selected from the group consisting of 802.11, 802.11a, 802.11b and 802.11g.

According to a third aspect of the present invention, a method for communicating information signals comprises the steps of: i.) providing: a receiver in selective communication with a first antenna and a second antenna; a first low-noise amplifier in communication with the first antenna and in selective communication with the receiver; and a second low-noise amplifier in communication with the second antenna and in selective communication with the receiver, wherein at least the first low-noise amplifier and the second low-noise amplifier are formed on a monolithic substrate; ii.) receiving information signals via at least one of the first antenna and the second antenna; iii.) generating a first amplified signal by the first low-noise amplifier by amplifying a first information signal received by the first antenna; iv.) generating a second amplified signal by the second low-noise amplifier by amplifying a second information signal received by the second antenna; and v.) selectively applying one of the first and second amplified signals to the receiver.

According to the third aspect, the method can comprise the steps of vi.) providing: a transmitter in communication with the first antenna; and vii.) transmitting information signals via the first antenna using the transmitter. According to exemplary embodiments, the receiver and the transmitter can be formed on the same monolithic substrate as the first and second low-noise amplifiers. The method can also comprise the steps of viii.) providing: a transmit/receive switch in communication with the first antenna, the first low-noise amplifier and the transmitter; and ix.) selectively connecting the first antenna to one of the first low-noise amplifier and the transmitter using the transmit/receive switch. The method according to the third aspect can also comprise the steps of: x.) providing: a filter in communication with the first antenna and the transmit/receive switch; xi.) filtering information signals communicated via the first antenna using the filter; xii.) providing: a filter in communication with the second antenna and the second low-noise amplifier; and xiii.) filtering information signals communicated via the second antenna using the filter. According to an exemplary embodiment, either or both of the filters can comprise a radio frequency bandpass filter, and the information signals communicated via the first and second antennas can comprise wireless radio frequency signals. The method according to the third aspect can also comprise the steps of: xiv.) providing: a controller in communication with the first low-noise amplifier; xv.) providing a control signal to the first low-noise amplifier to control the first low-noise amplifier using the controller; xvi.) providing: a controller in communication with the second low-noise amplifier; and xvii.) providing a control signal to the second low-noise amplifier to control the second low-noise amplifier using the controller. The method can be compliant with a standard selected from the group consisting of 802.11, 802.11a, 802.11b and 802.11g.

According to a fourth aspect of the present invention, a method for communicating information signals can comprise the steps of i.) receiving information signals via at least one of a first antenna and a second antenna; ii.) generating a first amplified signal by a first low-noise amplifier by amplifying a first information signal received by the first antenna, wherein the first low-noise amplifier is in communication with the first antenna and in selective communication with a receiver, and wherein the receiver is in selective communication with the first antenna and the second antenna; iii.) generating a second amplified signal by a second low-noise amplifier by amplifying a second information signal received by the second antenna, wherein at least the first low-noise amplifier and the second low-noise amplifier are formed on a monolithic substrate, and wherein the second low-noise amplifier in communication with the second antenna and in selective communication with the receiver; and iv.) selectively applying one of the first and second amplified signals to the receiver.

According to the fourth aspect, the method can comprise the step of v.) transmitting information signals via the first antenna using a transmitter, wherein the transmitter is in communication with the first antenna. According to exemplary embodiments, the receiver and the transmitter can be formed on the same monolithic substrate as the first and second low-noise amplifiers. The method can also comprise the steps of vi.) selectively connecting the first antenna to one of the first low-noise amplifier and the transmitter using a transmit/receive switch, wherein the transmit/receive switch is in communication with the first antenna, the first low-noise amplifier and the transmitter; vii.) filtering information signals communicated via the first antenna using a filter; and viii.) filtering information signals communicated via the second antenna using a filter. According to an exemplary embodiment, either or both of the filters can comprise a radio frequency bandpass filter, and the information signals communicated via the first and second antennas can comprise wireless radio frequency signals. The method according to the fourth aspect can also comprise the steps of: ix.) providing a control signal to the first low-noise amplifier to control the first low-noise amplifier using a controller, wherein the controller is in communication with the low-noise amplifier; and x.) providing a control signal to the second low-noise amplifier to control the second low-noise amplifier using a controller. The method can be compliant with a standard selected from the group consisting of 802.11, 802.11a, 802.11b and 802.11g.

According to a fifth aspect of the present invention, a system for communicating information signals includes a first means for generating a first amplified signal by amplifying a first information signal received by a first means for communicating. The system includes a second means for generating a second amplified signal by amplifying a second information signal received by a second means for communicating. According to exemplary embodiments, at least the first means for generating and the second means for generating can be formed on a monolithic substrate. The system includes a means for receiving one of the first and second amplified signals. The system also includes a means for selectively applying one of the first and second amplified signals to the means for receiving.

According to the fifth aspect, the system can include a means for transmitting information signals via the first means for communicating. According to exemplary embodiments, the receiver and transmitter can be formed on the same monolithic substrate as the first and second low-noise amplifiers. The system can also include a means for selectively connecting the first means for communicating to one of the first means for generating and the means for transmitting. The system can include a means for filtering information signals communicated via the first means for communicating. According to an exemplary embodiment, the means for filtering can comprise a radio frequency bandpass filter means. The system can include a means for filtering information signals communicated via the second means for communicating. According to an exemplary embodiment, the means for filtering can comprise a radio frequency bandpass filter means. According to exemplary embodiments, the information signals communicated via the first and second means for communicating can comprise wireless radio frequency signals. The system can include a means for providing a control signal to the first means for generating, to control the first means for generating. The system can also include a means for providing a control signal to the second means for generating, to control the second means for generating. The system can be compliant with a standard selected from the group consisting of 802.11, 802.11a, 802.11b and 802.11g.

According to a sixth aspect of the present invention, a system for communicating information signals includes a first antenna for communicating information signals and a second antenna for communicating information signals. The system includes a receiver for selectively receiving information signals via one of the first antenna and the second antenna. The receiver is in selective communication with the first antenna and the second antenna. The system includes a transmitter for transmitting information signals via the first antenna. The transmitter is in selective communication with the first antenna. The system includes a first low-noise amplifier for amplifying a first information signal received by the first antenna to generate a first amplified signal. The fast low-noise amplifier is in selective communication with the first antenna and the receiver. The system includes a transmit/receive switch for selectively connecting the first antenna to one of the first low-noise amplifier and the transmitter. The transmit/receive switch is in communication with the first antenna, the first low-noise amplifier and the transmitter. The system includes a second low-noise amplifier for amplifying a second information signal received by the second antenna to generate a second amplified signal. According to exemplary embodiments, at least the first low-noise amplifier and the second low-noise amplifier are formed on a monolithic substrate. The second low-noise amplifier is in communication with the second antenna and in selective communication with the receiver. The system also includes a switch for selectively applying one of the first and second amplified signals to the receiver. The switch is in communication with the first low-noise amplifier, the second low-noise amplifier and the receiver.

According to an exemplary embodiment of the sixth aspect, the receiver and the transmitter can be formed on the same monolithic substrate as the first and second low-noise amplifiers. The system can also include a filter for filtering information signals communicated via the first antenna. The filter can be in communication with the first antenna and the transmit/receive switch. According to an exemplary embodiment, the filter can comprise a radio frequency bandpass filter. The system can also include a filter for filtering information signals communicated via the second antenna. The filter can be in communication with the second antenna and the second low-noise amplifier. According to an exemplary embodiment, the filter can comprise a radio frequency bandpass filter. According to exemplary embodiments, the information signals communicated via the first and second antennas can comprise wireless radio frequency signals. The system can include a controller for providing a control signal to the first low-noise amplifier to control the first low-noise amplifier. The controller can be in communication with the first low-noise amplifier. The system can include a controller for providing a control signal to the second low-noise amplifier to control the second low-noise amplifier. The controller can be in communication with the second low-noise amplifier. The system can be compliant with a standard selected from the group consisting of 802.11, 802.11a, 802.11b and 802.11g.

According to a seventh aspect of the present invention, a system for communicating information signals can comprise a first antenna means for communicating information signals and a second antenna means for communicating information signals. The system can include a receiver means for selectively receiving information signals via one of the first antenna means and the second antenna means. The receiver means can be in selective communication with the first antenna means and the second antenna means. The system can include a transmitter means for transmitting information signals via the first antenna means. The transmitter means can be in selective communication with the first antenna means. The system can include a first low-noise amplifier means for amplifying a first information signal received by the first antenna means to generate a first amplified signal. The first low-noise amplifier means can be in selective communication with the first antenna means and the receiver means. The system can include a transmit/receive switch means for selectively connecting the first antenna means to one of the first low-noise amplifier means and the transmitter means. The transmit/receive switch means can be in communication with the first antenna means, the first low-noise amplifier means and the transmitter means. The system can include a second low-noise amplifier means for amplifying a second information signal received by the second antenna means to generate a second amplified signal. According to exemplary embodiments, at least the first low-noise amplifier means and the second low-noise amplifier means are formed on a monolithic substrate. The second low-noise amplifier means is in communication with the second antenna means and in selective communication with the receiver means. The system can include a switch means for selectively applying one of the first and second amplified signals to the receiver means. The switch means can be in communication with the first low-noise amplifier means, the second low-noise amplifier means and the receiver means.

According to an exemplary embodiment of the seventh aspect, the receiver means and the transmitter means can be formed on the same monolithic substrate as the first and second low-noise amplifier means. The system can also include a filter means for filtering information signals communicated via the first antenna means. The filter can be in communication with the first antenna means and the transmit/receive switch means. According to an exemplary embodiment, the filter means can comprise a radio frequency bandpass filter means. The system can include a filter means for filtering information signals communicated via the second antenna means. The filter means can be in communication with the second antenna means and the second low-noise amplifier means. According to an exemplary embodiment, the filter means can comprise a radio frequency bandpass filter means. According to exemplary embodiments, the information signals communicated via the first and second antenna means can comprise wireless radio frequency signals. The system can include a controller means for providing a control signal to the first low-noise amplifier means to control the first low-noise amplifier means. The controller means can be in communication with the first low-noise amplifier means. The system can include a controller means for providing a control signal to the second low-noise amplifier means to control the second low-noise amplifier means. The controller means can be in communication with the second low-noise amplifier means. The system can be compliant with a standard selected from the group consisting of 802.11, 802.11a, 802.11b and 802.11g.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Exemplary embodiments of the present invention are directed to a system and method for communicating information signals using dual low-noise amplifiers (LNAs) formed on the same monolithic substrate. According to exemplary embodiments, the system can include a receiver in selective communication with a first antenna and a second antenna. The receiver can be configured to selectively receive information signals via the first antenna or the second antenna. The system can include a first LNA in communication with the first antenna and in selective communication with the receiver. The first LNA can be configured to amplify a first information signal received by the first antenna to generate a first amplified signal. The system can also include a second LNA in communication with the second antenna and in selective communication with the receiver. According to exemplary embodiments, at least the first LNA and the second LNA are formed on a monolithic substrate. The second LNA can be configured to amplify a second information signal received by the second antenna to generate a second amplified signal. Either the first amplified signal or the second amplified signal can be selectively applied to the receiver.

The use of LNAs located on separate substrates, with their concomitant switches and filters, can result in additional insertion loss and adversely effect the received signal in a transceiver system. Thus, exemplary embodiments of the present invention provide dual LNAs on a monolithic substrate. The monolithic substrate can include other components of the transceiver, including power amplifiers or any other component or components of the transmitter and/or receiver. Additionally, switches located between the antenna and the LNAs can add insertion loss and also adversely affect the received signal. According to exemplary embodiments, having signal selection done at the output of the dual low-noise amplifiers can reduce that insertion loss, thereby improving gain, due to the elimination of the switches located between the antennas and the LNAs. Furthermore, by having the receiver in selective communication with a second LNA coupled to the second antenna, the approximately 3 dB loss associated with, for example, an antenna selection switch, a radio frequency (RF) bandpass filter, and a transmit/receive switch can be eliminated for the signal received on the second antenna. An additional cost savings can be achieved in the system as a result of the concomitant reduction in components and formation of the LNAs and other components on the monolithic substrate.

Figure 2:
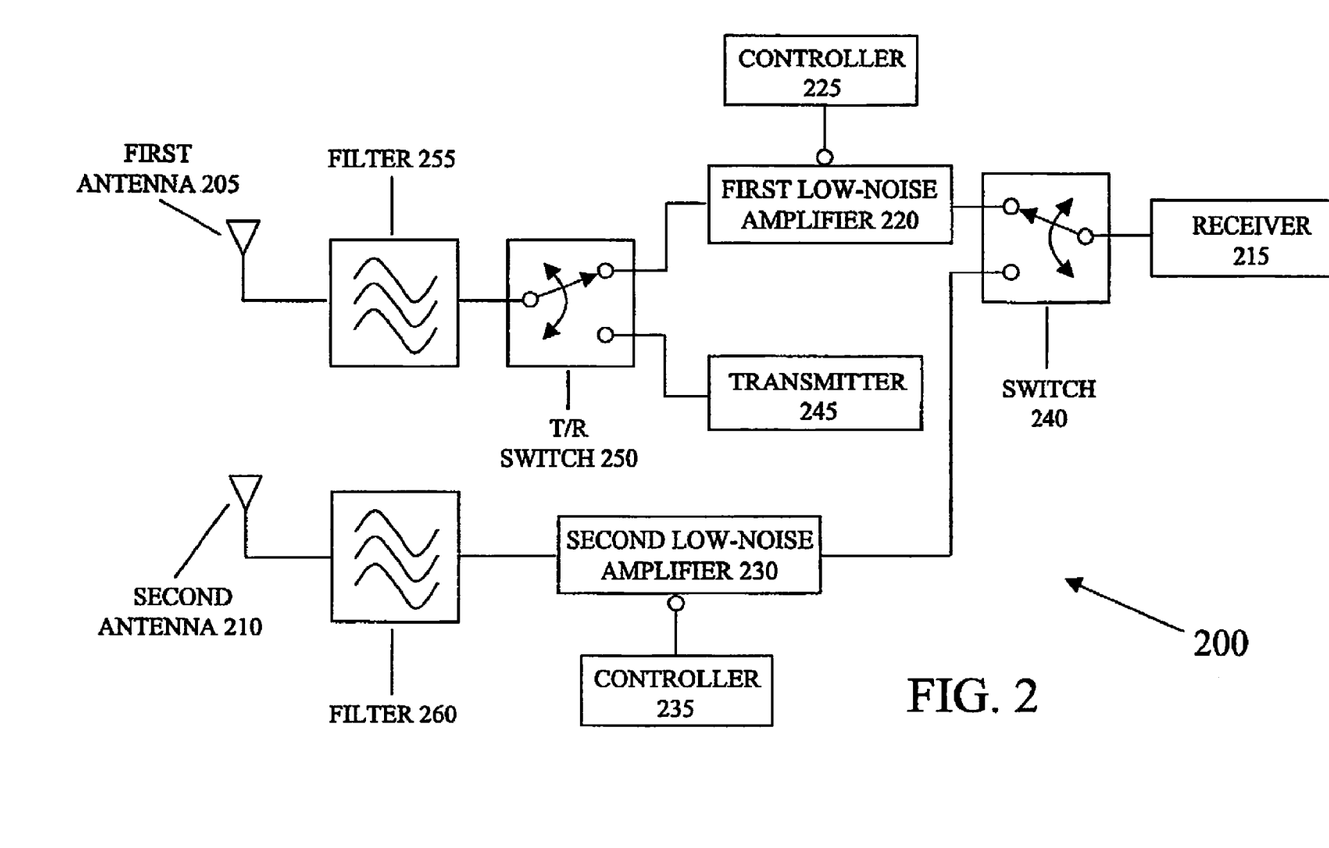
FIG. 2 is a diagram illustrating a system for communicating information signals, in accordance with an exemplary embodiment of the present invention.

These and other aspects of the present invention will now be described in greater detail. FIG. 2 is a diagram illustrating a system 200 for communicating information signals, in accordance with an exemplary embodiment of the present invention. The system 200 can include a first antenna 205 configured to communicate information signals. The first antenna 205 can be any type of antenna in any type of configuration, depending on the type of information signals to be transmitted and received by system 200. The system 200 can include a second antenna 210 configured to communicate information signals. The second antenna 210 can be any type of antenna in any type of configuration, depending on the type of information signals to be transmitted and received by system 200. According to an exemplary embodiment, the information signals communicated via the fast antenna 205 and second antenna 210 can comprise wireless radio frequency (RF) signals and the like, for example, as part of a wireless transceiver system. However, exemplary embodiments of the present invention can be used in any type of wired or wireless transceiver system capable of transmitting and receiving information signals.

As used herein, "information signals" can be any type of information signal that can be transmitted and/or received through a communication medium capable of transmitting/receiving the information signal. For example, the information signals can be information that is modulated onto a carrier signal and transmitted and/or received wirelessly, such as RF signals or the like.

The system 200 can include a receiver 215 in selective communication with the first antenna 205 and the second antenna 210. According to exemplary embodiments, the receiver 215 can be configured to selectively receive information signals via one of the first antenna 205 and the second antenna 210. The receiver 215 can be any type of electrical or electronic component or device capable of receiving information signals. The nature, type, performance characteristics, and the like of the receiver 215 will depend on the type and nature of the information signals to be received by the system 200. For example, for wireless communication, a RAKE receiver could be used for receiver 215. For example, the receiver 215 can perform at least part of the processing on the received information signals to demodulate the received information signal.

The system 200 can include a first LNA 220 in communication with the first antenna 205 and in selective communication with the receiver 215. According to exemplary embodiments, the receiver 215 can be selectively connected to an output of the first LNA 220, while an input of the first LNA 220 can be connected to the first antenna 205 using any type of electrical connection capable of communicating electrical signals, such as, for example, a wire and the like. According to an exemplary embodiment, first LNA 220 and any or all of the components that can comprise the receiver 215 can be formed on the same monolithic substrate. The first LNA 220 can be configured to amplify a first information signal received by the first antenna 205 to generate a first amplified signal at the output of the first LNA 220. The first LNA 220 can be any type of low-noise amplifier, power amplifier or the like for amplifying very low-level received signals, while adding only minimal amounts of noise to the signal. The nature, type, performance characteristics, and the like of the first LNA 220 will depend upon the type of information signals to be received by the system 200, the desired level of performance of the system and the LNAs, and the like.

The first LNA 220 should be highly linear to handle weak signals in the presence of large interfering signals. Thus, the first LNA 220 can include an adjustable bias control that allows the user to meet minimum linearity requirements. According to an exemplary embodiment, the system 200 can include a controller 225 in communication with the first LNA 220. The controller 225 can be connected to the first LNA 220 using any type of electrical connection capable of communicating electrical information, such as, for example, a wire or the like. According to an exemplary embodiment, the controller 225 can be formed on the same monolithic substrate as (any or all components of) the receiver 215, and the first LNA 220. The controller 225 can be configured to provide a control signal to the first LNA 220 to control the first LNA 220. For example, a feedback circuit can be used for controller 225 to control a bias current applied to the first LNA 220. The feedback circuit can sense the current in the first LNA 220 and compare the sensed current with a reference current using a comparator. The output of the comparator can then bias the input of the first LNA 220 to maintain linearity. Other mechanisms can be used for controller 225 to control, for example, the linearity of the first LNA 220, or any other characteristic of the first LNA 220.

The system 200 can include a second LNA 230 in communication with the second antenna 210 and in selective communication with the receiver 215. According to exemplary embodiments, the receiver 215 can be selectively connected to an output of the second LNA 230, while an input of the second LNA 230 can be connected to the second antenna 210 using any type of electrical connection capable of communicating electrical signals, such as, for example, a wire and the like. According to exemplary embodiments, at least the first LNA 220 and the second LNA 230 can be formed on the same monolithic substrate. For example, the second LNA 230 can be formed on the same monolithic substrate as (any or all components of) the receiver 215, the first LNA 220, and the controller 225, or any combination thereof. The second LNA 230 can be configured to amplify a second information signal received by the second antenna 210 to generate a second amplified signal at the output of the second LNA 230. The second LNA 230 can be any type of low-noise amplifier, power amplifier or the like for amplifying very low-level received signals, while adding only minimal amounts of noise to the signal. The nature, type, performance characteristics, and the like of the second LNA 230 will depend upon the type of information signals to be received by the system 200, the desired level of performance of the system and the LNAs, and the like.

The second LNA 230 should be highly linear to handle weak signals in the presence of large interfering signals. Thus, the second LNA 230 can include an adjustable bias control that allows the user to meet minimum linearity requirements. According to an exemplary embodiment, the system 200 can include a controller 235 in communication with the second LNA 230. The controller 235 can be connected to the second LNA 230 using any type of electrical connection capable of communicating electrical information, such as, for example, a wire or the like. According to an exemplary embodiment, the controller 235 can be formed on the same monolithic substrate as (any or all components of) the receiver 215, the first LNA 220, the controller 225, and the second LNA 230, or any combination thereof. The controller 235 can be configured to provide a control signal to the second LNA 230 to control the second LNA 230. For example, a feedback circuit can be used for controller 235 to control a bias current applied to the second LNA 230. The feedback circuit can sense the current in the second LNA 230 and compare the sensed current with a reference current using a comparator. The output of the comparator can then bias the input of the second LNA 230 to maintain linearity. Other mechanisms can be used for controller 235 to control, for example, the linearity of the second LNA 230, or any other characteristic of the second LNA 230.

According to exemplary embodiments, one of the first and second amplified signals can be selectively applied to the receiver 215. In other words, the selection of the information signal to be processed by the receiver 215 can be done at the output of the first and second LNAs 220 and 230, respectively. According to exemplary embodiments, the system 200 can include a switch 240 in communication with the first LNA 220, the second LNA 230 and the receiver 215. The inputs to the switch 240 can be connected to the outputs of the first and second LNAs 220 and 230, respectively, using any type of electrical connection capable of communicating electrical information, such as a wire or the like. The output of the switch 240 can be connected to the input of the receiver 215 using any type of electrical connection capable of communicating electrical information, such as a wire or the like. According to an exemplary embodiment, the switch 240 can be formed on the same monolithic substrate as (any or all components of) the receiver 215, the first LNA 220, the controller 225, the second LNA 230, and the controller 235, or any combination thereof.

According to exemplary embodiments, the switch 240 can be configured to selectively apply the one of the first and second amplified signals to the receiver 215. The switch 240 can be any type of electrical or electronic switch or relay capable of selectively connecting or otherwise applying the output of either the first LNA 220 or the second LNA 230 to the input of the receiver 215. Alternatively, the switch 240 can be a "virtual" switch implemented through, for example, software code. However, the switch 240 can be any combination of hardware, firmware, and software. The switch 240 can be controlled using control hardware, firmware, software, any combination thereof, or any other type of control circuitry capable of actuating switch 240.

According to an exemplary embodiment, the system 200 can include a transmitter 245 in communication with the first antenna 205. The transmitter 245 can be connected to first antenna 205 using any type of electrical connection capable of communicating electrical information, such as a wire or the like. According to an exemplary embodiment, any or all components that comprise the receiver and the transmitter can be formed on the same monolithic substrate as first LNA 220 and second LNA 230. For example, a power amplifier of the transmitter, or any other component, can be formed on the same monolithic substrate as the first LNA 220 and second LNA 230. Alternatively, any or all of the components of the transmitter 245 can be formed on the same monolithic substrate as (any or all components of) the receiver 215, the first LNA 220, the controller 225, the second LNA 230, controller 235 and the switch 240. According to exemplary embodiments, the transmitter 245 can be configured to transmit information signals via the first antenna 205. The transmitter 245 can be any type of electrical or electronic component or device capable of transmitting information signals. The nature, type, performance characteristics, and the like of the transmitter 245 will depend on the type and nature of the information signals to be transmitted by the system 200. The transmitter 245 can, for example, perform at least part of the processing on the information signal to modulate the information signal for transmission.

According to an exemplary embodiment, the system can include a transmit/receive switch 250 in communication with the first antenna 205, the first LNA 220 and the transmitter 245. The transmit/receive switch 250 can be connected to the antenna 205, the first LNA 220 and the transmitter 245 using any type of electrical connection capable of communicating electrical signals, such as a wire or the like. According to an exemplary embodiment, the transmit/receive switch 250 can be formed on the same monolithic substrate as (any or all components of) the receiver 215, the first LNA 220, the controller 225, the second LNA 230, controller 235, the switch 240, and transmitter 245.

According to exemplary embodiments, the transmit/receive switch 250 can be configured to selectively connect the first antenna 205 to either the fast LNA 220 or the transmitter 245. For example, to receive information signals, the transmit/receive switch 250 can be configured to connect the fast antenna 205 to the input of the first LNA 220. To transmit information signals, the transmit/receive switch 250 can be configured to connect the first antenna 205 to the output of the transmitter 245. The transmit/receive switch 250 can be any type of electrical or electronic switch or relay capable of selectively connecting either the input of the fast LNA 220 or output of the transmitter 245 to the first antenna 205. Alternatively, the transmit/receive switch 250 can be a "virtual" switch implemented through, for example, software code. However, the transmit/receive switch 250 can be any combination of hardware, firmware, and software. The transmit/receive switch 250 can be controlled using control hardware, firmware, software, any combination thereof, or any other type of control circuitry capable of actuating transmit receive switch 250.

According to exemplary embodiments, filters can be used to eliminate interfering signals outside the frequency band of interest. For example, the system 200 can include a filter 255 in communication with the first antenna 205 and the transmit/receive switch 250. The filter 255 can be configured to filter information signals communicated via the first antenna 205. Additionally or alternatively, the system 200 can include a filter 260 in communication with the second antenna 210 and the second LNA 230. The filter 260 can be configured to filter information signals communicated via the second antenna 210. The filters 255 and 260 can be any combination of hardware, firmware, and software that is capable of filtering the information signals. The filter 255 can be connected to the first antenna 205 and the transmit/receive switch 250 using any type of electrical connection capable of communicating electrical information, such as a wire or the like. The filter 260 can be connected to the second antenna 210 and the second LNA 230 using any type of electrical connection capable of communicating electrical information, such as a wire or the like. According to an exemplary embodiment, either or both of filters 255 and 260 can be formed on the same monolithic substrate as (any or all components of) the receiver 215, the first LNA 220, the controller 225, the second LNA 230, controller 235, the switch 240, transmitter 245, and the transmit/receive switch 250.

The type, nature, performance characteristics and the like of the filters 255 and 260 will depend on the type and nature of the information signals to be communicated by the system 200. According to an exemplary embodiment, the filters 255 and 260 can comprise RF filters, such as, for example, RF bandpass filters, to filter noise from RF information signals, and that can also be used, for example, to reject image signal or image frequency interferers. An image signal is a unwanted noise signal that is near in frequency (e.g., within twice the intermediate frequency (IF)) to the received RF signal and which can be mixed into the baseband signal by the mixer, to the detriment of the received signal. Thus, the filters 255 and 260 can be used to filter noise and perform image signal rejection in those environments where the presence of noise and image signals is of concern. However, the filters 255 and 260 can be any type of filter for filtering the information signals, such as, for example, a low-pass filter (e.g., a LC low-pass filter) or the like. Since the filters 255 and 260 can each add as much as approximately 1.5 dB in insertion loss to the system 200, use of either or both of the filters 255 and 260 is not necessary according to exemplary embodiments of the present invention.

Those of ordinary skill will recognize that the system 200 can include any additional components that can be used for receiving and transmitting information signals, including mixers, local oscillators, demodulators, modulators, automatic gain controls, phase locked loops, filters, power amplifiers, power supplies or any other components in any combination that can be used for receiving and transmitting information signals, depending upon the nature and type of information signals to be communicated and the environment in which the system 200 is to be used. The system 200 can be connected to additional components, such as, for example, any type of processor, including any type of microprocessor, microcontroller, digital signal processor (DSP), application-specific integrated circuit (ASIC), programmable read-only memory (PROM), erasable programmable read-only memory (EPROM), electrically-erasable programmable read-only memory (EEPROM), or the like. The system 200 can also be connected to any type of computer memory or any other type of electronic storage medium that is located either internally or externally to the processor such as, for example, read-only memory (ROM), random access memory (RAM), cache memory, compact disc read-only memory (CDROM), electro-optical memory, magneto-optical memory, or the like. The processor and memory can be used, for example, to perform additional processing on received information signals that have been output by receiver 215, for performing pre-processing on transmitted information signals prior to being transmitted by transmitter 245, or for controlling any part of the system 200.

Figure 3A:
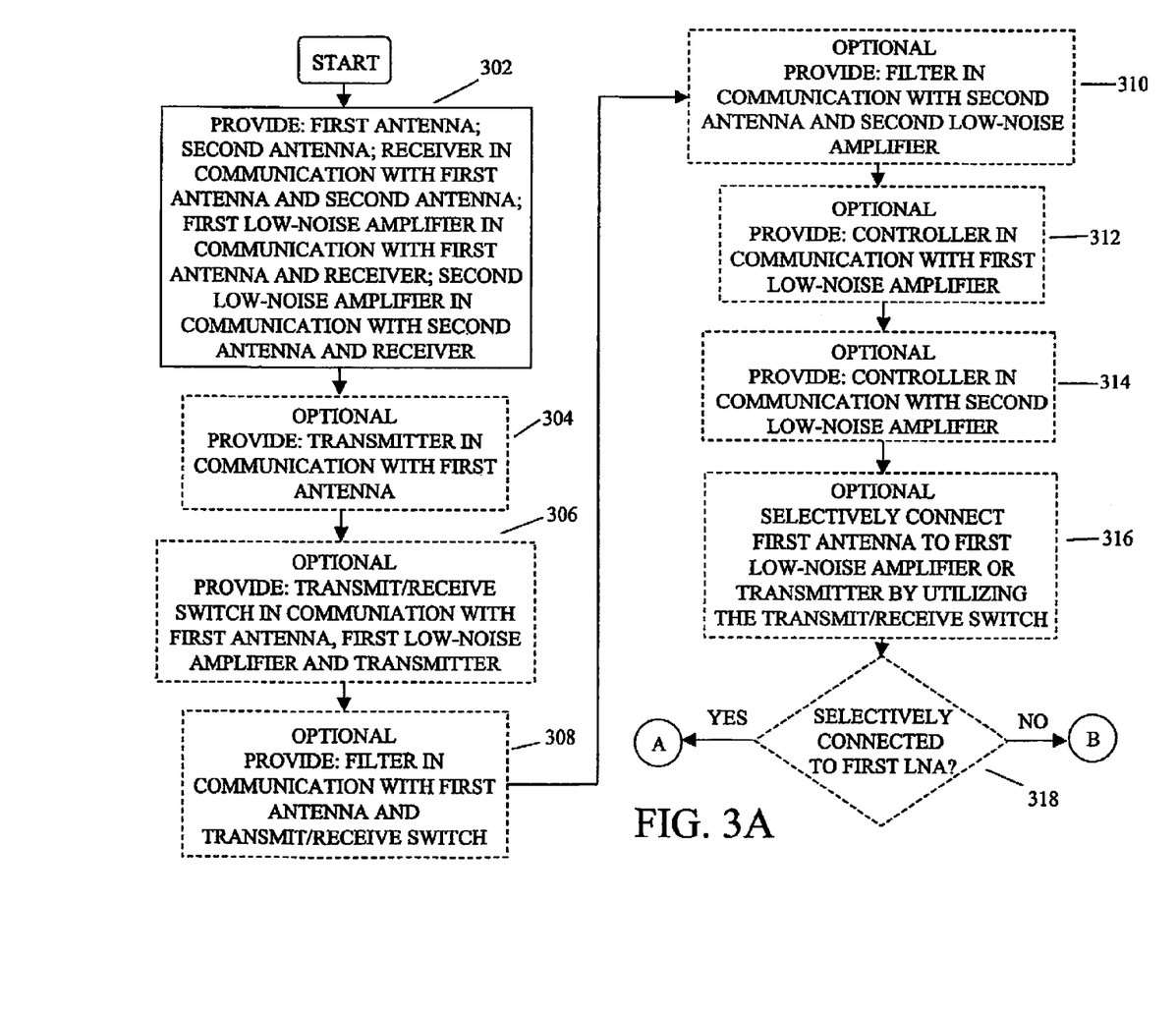
FIGS. 3A, 3B and 3C are flowcharts illustrating steps for communicating information signals, in accordance with an exemplary embodiment of the present invention.
Figure 3B:
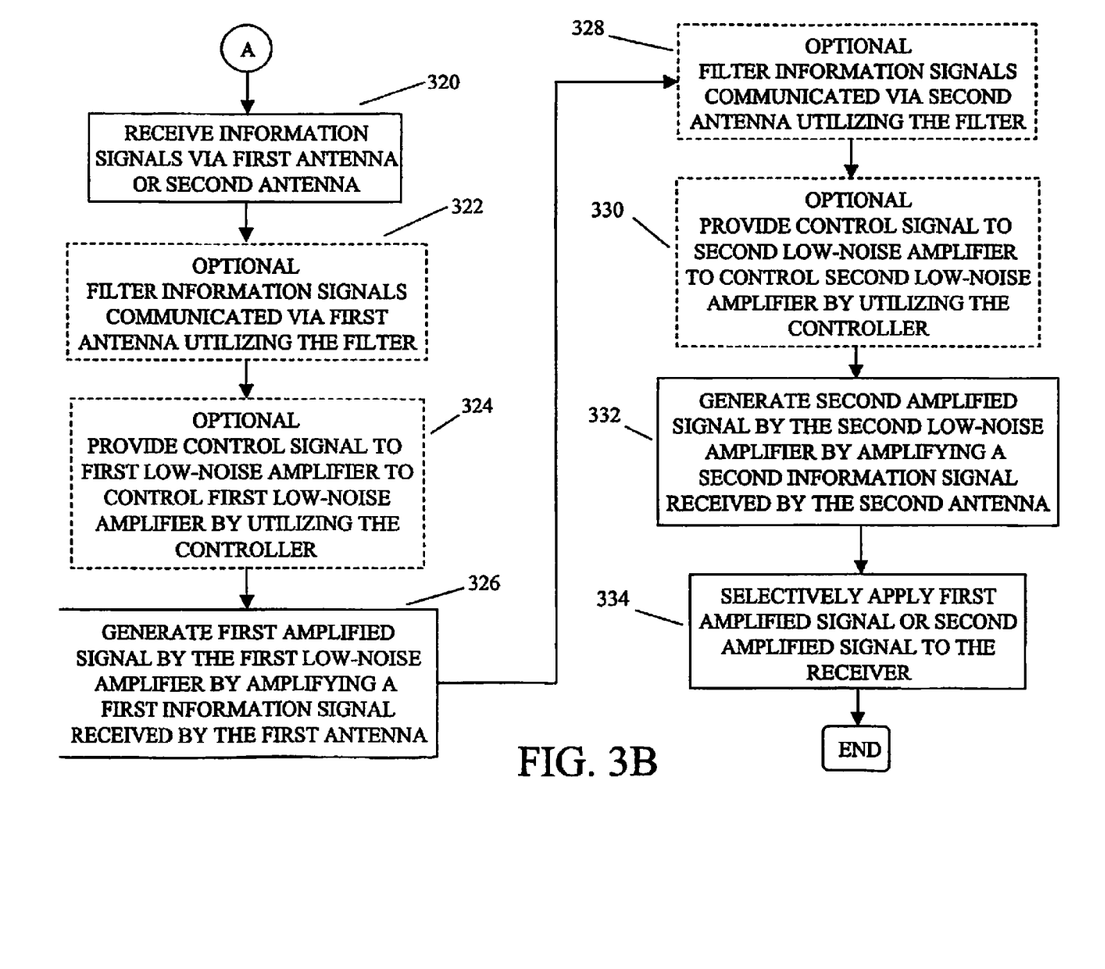
Figure 3C:
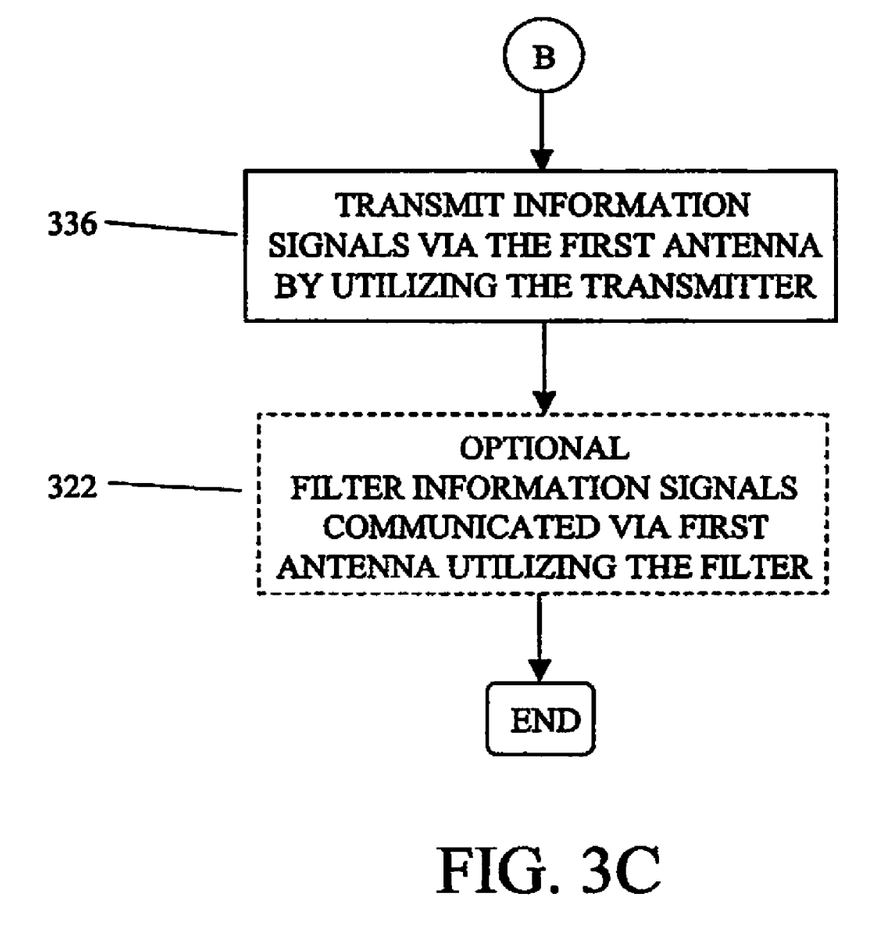

FIGS. 3A, 3B and 3C are flowcharts illustrating steps for communicating information signals, in accordance with an exemplary embodiment of the present invention. In step 302 of FIG. 3A, the following can be provided: a receiver in selective communication with a first antenna and a second antenna; a first low-noise amplifier in communication with the first antenna and in selective communication with the receiver; and a second low-noise amplifier in communication with the second antenna and in selective communication with the receiver. According to exemplary embodiments, at least the first low-noise amplifier and the second low-noise amplifier are formed on a monolithic substrate. According to an exemplary embodiment, the information signals communicated via the first and second antennas can comprise wireless RF signals or the like. Optionally, in step 304, a transmitter in communication with the first antenna can be provided. According to an exemplary embodiment, any or all of the components that can comprise the receiver and the transmitter can be formed on the same monolithic substrate as the first and second low-noise amplifiers. Optionally, in step 306, a transmit/receive switch in communication with the first antenna, the first low-noise amplifier and the transmitter can be provided. Optionally, in step 308, a filter in communication with the first antenna and the transmit/receive switch can be provided. According to an exemplary embodiment, the filter can comprise a RF filter, such as, for example, a RF bandpass filter, a low-pass filter or the like. Optionally, in step 310, a filter in communication with the second antenna and the second low-noise amplifier can be provided. According to an exemplary embodiment, the filter can comprise a RF filter, such as, for example, a RF bandpass filter, a low-pass filter or the like. Optionally, in step 312, a controller in communication with the first low-noise amplifier can be provided. Optionally, in step 314, a controller in communication with the second low-noise amplifier can be provided. Optionally, in step 316, the first antenna can be selectively connected to either the first low-noise amplifier or the transmitter using the transmit/receive switch.

In step 318, if the receiver is selectively connected to either the first or second antenna, then in step 320 of FIG. 313, information signals can be received via one of the first antenna and the second antenna. Optionally, in step 322, information signals communicated via the first antenna can be filtered using the filter in communication with the first antenna and the transmit/receive switch. Optionally, in step 324, a control signal can be provided to the first low-noise amplifier to control the first low-noise amplifier using the controller in communication with the first low-noise amplifier. In step 326, a first amplified signal can be generated by the first low-noise amplifier by amplifying a first information signal received by the first antenna. Optionally, in step 328, information signals communicated via the second antenna can be filtered using the filter in communication with the second antenna and the second low-noise amplifier. Optionally, in step 330, a control signal can be provided to the second low-noise amplifier to control the second low-noise amplifier using the controller in communication with the second low-noise amplifier. In step 332, a second amplified signal can be generated by the second low-noise amplifier by amplifying a second information signal received by the second antenna. In step 334, either the first amplified signal or the second amplified signal can be selectively applied to the receiver.

Instep 318 of FIG. 3A, if the receiver is not selectively connected to either the first or second antenna (e.g., the first antenna is selectively connected to the transmitter), then in step 336 of FIG. 3C, information signals can be transmitted via the first antenna using the transmitter. Optionally, in step 322 of FIG. 3C, information signals communicated via the first antenna can be filtered prior to transmission using the filter in communication with the first antenna and the transmit/receive switch. According to an exemplary embodiment, the same filter used to filter the information signals received via the first antenna can be used to filter the transmitted information signals. According to exemplary embodiments, the method illustrated in FIGS. 3A, 3B and 3C can be compliant with a standard selected from the group consisting of 802.11, 802.11a, 802.11b and 802.11g.

Figure 4A:
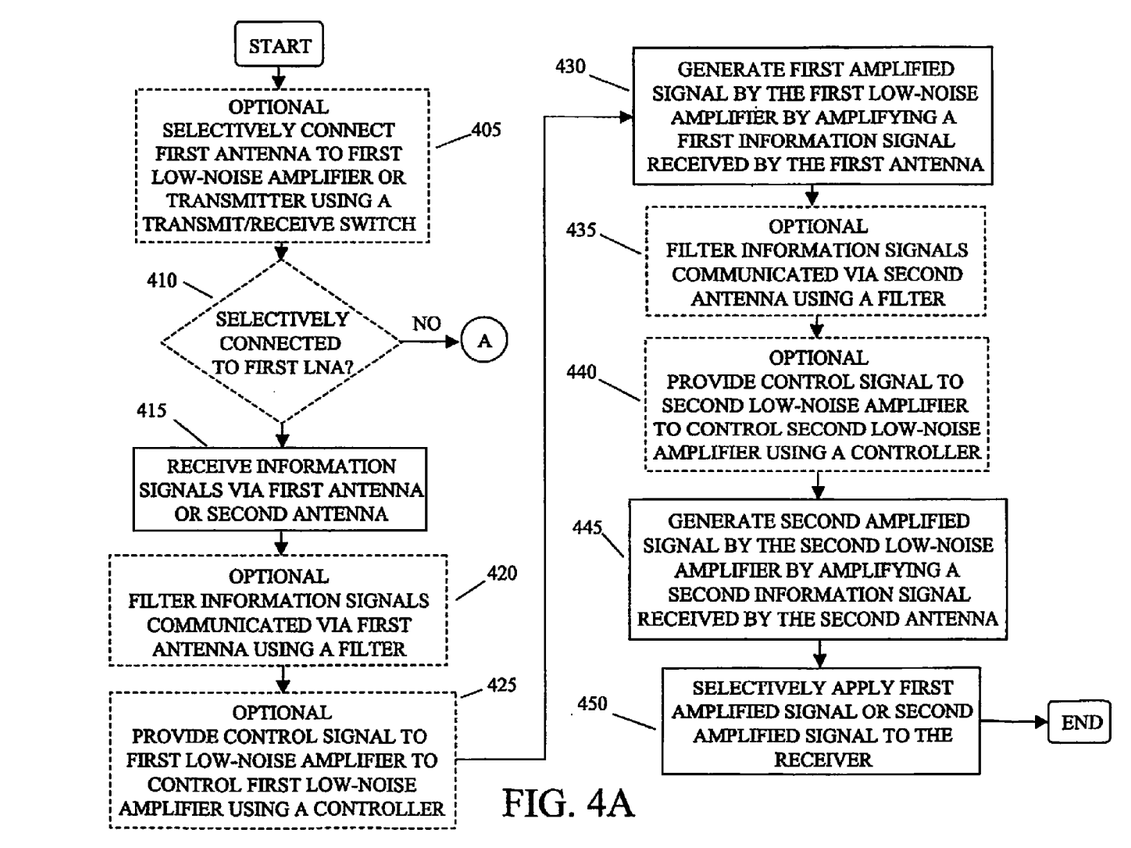
FIGS. 4A and 4B are flowcharts illustrating steps for communicating information signals, in accordance with an alternative exemplary embodiment of the present invention.
Figure 4B:
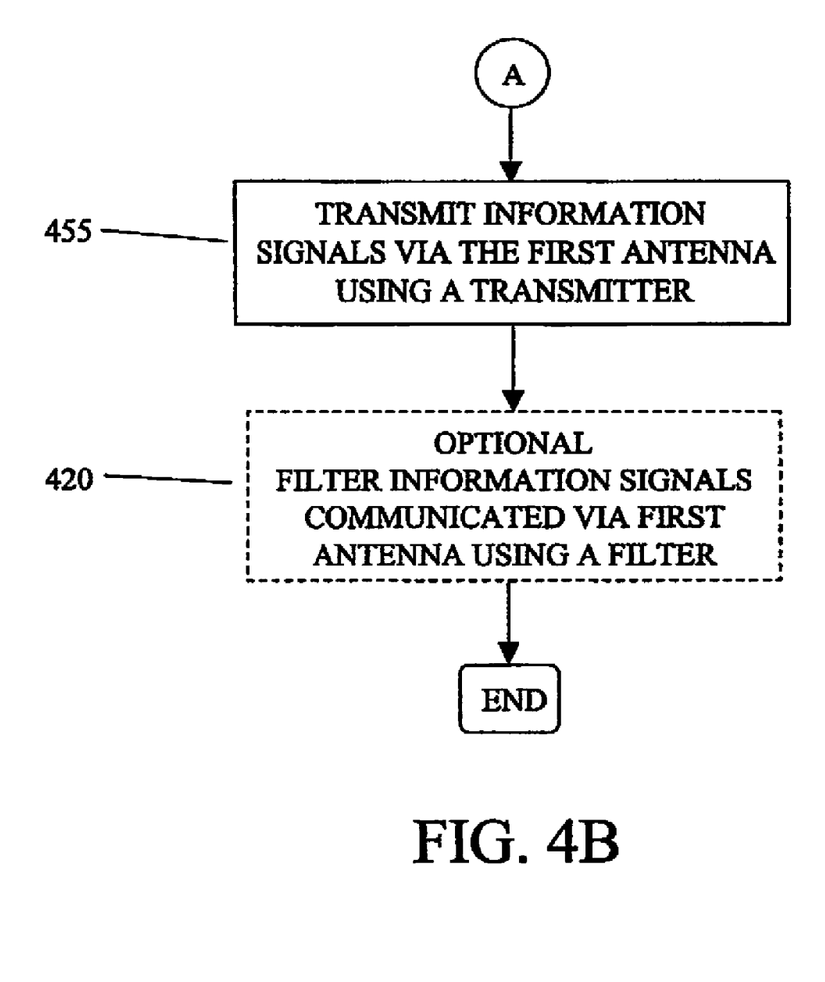

FIGS. 4A and 4B are flowcharts illustrating steps for communicating information signals, in accordance with an alternative exemplary embodiment of the present invention. Optionally, in step 405 of FIG. 4A, a first antenna can be selectively connected to either a first low-noise amplifier or a transmitter using a transmit/receive switch. The transmit/receive switch can be in communication with the first antenna, the first low-noise amplifier and the transmitter. Instep 410, if the receiver is selectively connected to either a first or second antenna, then in step 415, information signals can be received via the first antenna and/or the second antenna. According to an exemplary embodiment, the information signals communicated via the first and second antennas can comprise wireless RF signals or the like. Optionally, in step 420, information signals communicated via the first antenna can be filtered using a filter. The filter can be in communication with the first antenna and the transmit/receive switch. According to an exemplary embodiment, the filter can comprise a RF filter, such as, for example, a RF bandpass filter, a low-pass filter or the like. Optionally, in step 425, a control signal can be provided to the first low-noise amplifier to control the first low-noise amplifier using a controller. The controller can be in communication with the first low-noise amplifier. In step 430, a first amplified signal can be generated by the first low-noise amplifier by amplifying a first information signal received by the first antenna. The first low-noise amplifier can be in communication with the first antenna and a receiver. The receiver can be in communication with the first antenna and the second antenna.

Optionally, instep 435, information signals communicated via the second antenna can be filtered using a filter. The filter can be in communication with the second antenna and a second low-noise amplifier. According to an exemplary embodiment, the filter can comprise a RF filter, such as, for example, a RF bandpass filter, a low-pass filter or the like. Optionally, in step 440, a control signal can be provided to the second low-noise amplifier to control the second low-noise amplifier using a controller. The controller can be in communication with the second low-noise amplifier. In step 445, a second amplified signal can be generated by the second low-noise amplifier by amplifying a second information signal received by the second antenna. According to exemplary embodiments, at least the first low-noise amplifier and the second low-noise amplifier are formed on a monolithic substrate. According to an exemplary embodiment, any or all of the components that can comprise the receiver and the transmitter can be formed on the same monolithic substrate as the first and second low-noise amplifiers. The second low-noise amplifier can be in communication with the second antenna and the receiver. In step 450, either the first amplified signal or the second amplified signal can be selectively applied to the receiver.

Instep 410 of FIG. 4A, if the receiver is not selectively connected to either the first or second antenna (e.g., the first antenna is selectively connected to the transmitter), then, optionally, in step 455 of FIG. 4B, information signals can be transmitted via the first antenna using the transmitter. The transmitter can be in communication with the first antenna. Optionally, in step 420 of FIG. 4B, information signals communicated via the first antenna can be filtered prior to transmission using the filter in communication with the first antenna and the transmit/receive switch. According to an exemplary embodiment, the same filter used to filter the information signals received via the first antenna can be used to filter the transmitted information signals. According to exemplary embodiments, the method illustrated in FIGS. 4A and 4B can be compliant with a standard selected from the group consisting of 802.11, 802.11a, 802.11b and 802.11g.

The steps of a computer program as illustrated in FIGS. 3A, 3B, 3C, 4A and 4B for communicating information signals can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Exemplary embodiments of the present invention can be used in any device or system that communicates information, including both wired and wireless communication systems, particularly where low-power, high gain transceiver systems are needed. For example, exemplary embodiments can be used in cellular telephone and other wireless communication devices.

It will be appreciated by those ordinary skill in the art that the present invention can be embodied in various specific forms without departing from the spirit or essential characteristics thereof The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated herein by reference in their entireties.

What is claimed is:

1. A transceiver system, comprising:
a first receive path including
a first antenna configured to receive first signals,
a first configuration switch in communication with the first antenna,
a first low noise amplifier configured to amplify the first signals,
a second configuration switch in communication with the first low noise amplifier, wherein the first low noise amplifier is connected between the first configuration switch and the second configuration switch, and
a receiver, wherein the first receive path is selectively configured to supply the amplified first signals to the receiver via the first antenna, the first configuration switch, the first low noise amplifier, and the second configuration switch, and
wherein the second configuration switch is connected between (i) the receiver and (ii) at least one of the first low noise amplifier and the first configuration switch;
a second receive path comprising
a second antenna configured to receive second signals,
a second low noise amplifier configured to amplify the second signals, wherein the first low noise amplifier and second low noise amplifier are formed on a monolithic substrate,
the second configuration switch, and
the receiver, wherein the second receive path (i) includes fewer configuration switches than the first receive path and (ii) is selectively configured to supply the amplified second signals to the receiver via the second antenna, the second low noise amplifier, and the second configuration switch; and
a transmit path comprising
the first antenna,
the first configuration switch, and
a transmitter, wherein the transmit path is selectively configured to send transmit signals via the transmitter, the first configuration switch, and the first antenna.

2. The transceiver system of claim 1, wherein the receiver and the transmitter are also formed on the monolithic substrate.

3. The transceiver system of claim 1, further comprising a filter configured to filter the first signals from the first antenna, wherein the filter is arranged between the first antenna and the first configuration switch.

4. The transceiver system of claim 3, wherein the filter comprises a radio frequency bandpass filter.

5. The transceiver system of claim 1, further comprising a filter configured to filter the second signals from the second antenna,
   wherein the filter is arranged between the second antenna and the second low noise amplifier.

6. The transceiver system of claim 5, wherein the filter comprises a radio frequency bandpass filter.

7. The transceiver system of claim 1, wherein each of the first signals and the second signals comprises wireless radio frequency signals.

8. The transceiver system of claim 1, further comprising a controller configured to provide a control signal to the first low noise amplifier to control the first low noise amplifier.

9. The transceiver system of claim 1, further comprising a controller configured to provide a control signal to the second low noise amplifier to control the second low noise amplifier.

10. A transceiver system, comprising:
    a first receive path including
       a first antenna configured to receive first signals,
       a first configuration switch in communication with the first antenna,
       a first low noise amplifier configured to amplify the first signals,
       a second configuration switch in communication with the first low noise amplifier, wherein the first low noise amplifier is connected between the first configuration switch and the second configuration switch, and
       a receiver configured to selectively receive the amplified first signals via the first antenna, the first configuration switch, the first low noise amplifier, and the second configuration switch, wherein the second configuration switch is connected between (i) the receiver and (ii) at least one of the first low noise amplifier and the first configuration switch;
    a second receive path comprising
       a second antenna configured to receive second signals,
       a second low noise amplifier configured to amplify the second signals, wherein the first low noise amplifier and second low noise amplifier are formed on a monolithic substrate,
       the second configuration switch, and
       the receiver, wherein the receiver selectively receives the amplified second signals via the second antenna, the second low noise amplifier, the second configuration switch, and not the first configuration switch; and
    a transmit path comprising
       the first antenna,
       the first configuration switch, and
       a transmitter, wherein the transmitter selectively sends transmit signals via the first configuration switch and the first antenna.

11. The transceiver system of claim 10, wherein the receiver and the transmitter are also formed on the monolithic substrate.

12. The transceiver system of claim 10, further comprising a filter configured to filter the first signals from the first antenna,
    wherein the filter is arranged between the first antenna and the first configuration switch.

13. The transceiver system of claim 12, wherein the filter comprises a radio frequency bandpass filter.

14. The transceiver system of claim 10, further comprising a filter configured to filter the second signals from the second antenna,
    wherein the filter is arranged between the second antenna and the second low noise amplifier.

15. The transceiver system of claim 14, wherein the filter comprises a radio frequency bandpass filter.

16. The transceiver system of claim 10, wherein each of the first signals and the second signals comprises wireless radio frequency signals.

17. The transceiver system of claim 10, further comprising a controller configured to provide a control signal to the first low noise amplifier to control the first low noise amplifier.

18. The transceiver system of claim 10, further comprising a controller configured to provide a control signal to the second low noise amplifier to control the second low noise amplifier.

19. The transceiver system of claim 1, wherein the first configuration switch is directly connected to the transmitter.

20. The transceiver system of claim 1, wherein the first configuration switch connects the first antenna to the transmitter when the second configuration switch connects the second antenna to the receiver.

21. The transceiver system of claim 1, further comprising a controller configured to (i) sense current of the first low noise amplifier, (ii) compare the current with a reference current to generate an output, and (iii) adjust bias of the first low noise amplifier based on the output.

22. The transceiver system of claim 1, further comprising a feedback circuit that adjusts bias of the first low noise amplifier.

23. The transceiver system of claim 1, wherein the second low noise amplifier is connected between the second antenna and the second configuration switch.

24. The transceiver system of claim 1, further comprising a controller configured to (i) sense current of the second low noise amplifier, (ii) compare the current with a reference current to generate an output, and (iii) adjust bias of the second low noise amplifier based on the output.

25. The transceiver system of claim 10, wherein:
    the first configuration switch is directly connected to the transmitter; and
    the first configuration switch connects the first antenna to the transmitter when the second configuration switch connects the second antenna to the receiver.

* * * * *